United States Patent
Liu et al.

(10) Patent No.: US 10,228,594 B2
(45) Date of Patent: Mar. 12, 2019

(54) ARRAY SUBSTRATE, DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Chong Liu, Beijing (CN); Wei Wang, Beijing (CN); Haisheng Zhao, Beijing (CN); Zhilong Peng, Beijing (CN); Zhilian Xiao, Beijing (CN); Huanping Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/122,585

(22) PCT Filed: Aug. 17, 2015

(86) PCT No.: PCT/CN2015/087216
§ 371 (c)(1),
(2) Date: Aug. 30, 2016

(87) PCT Pub. No.: WO2016/169163
PCT Pub. Date: Oct. 27, 2016

(65) Prior Publication Data
US 2017/0068142 A1    Mar. 9, 2017

(30) Foreign Application Priority Data

Apr. 24, 2015 (CN) .......................... 2015-1-0201759

(51) Int. Cl.
*G02F 1/1362* (2006.01)
*G02F 1/1343* (2006.01)
*G02F 1/1368* (2006.01)

(52) U.S. Cl.
CPC ...... *G02F 1/136286* (2013.01); *G02F 1/1368* (2013.01); *G02F 1/13439* (2013.01);
(Continued)

(58) Field of Classification Search
CPC ......... G02F 1/136286; G02F 1/134309; G02F 1/134336; G02F 1/13439; G02F 1/1368;
(Continued)

(56) References Cited

U.S. PATENT DOCUMENTS

2002/0001861 A1    1/2002  Sung et al.
2008/0099764 A1    5/2008  Choi et al.
(Continued)

FOREIGN PATENT DOCUMENTS

CN    1011695 A      4/2008
CN    101334564 A   12/2008
(Continued)

OTHER PUBLICATIONS

International Search Report and Written Opinion in PCT/CN2015/087216 dated Jan. 18, 2016, along with English translation. 14 pages.
(Continued)

*Primary Examiner* — Tucker J Wright
(74) *Attorney, Agent, or Firm* — Womble Bond Dickinson (US) LLP

(57) ABSTRACT

The present disclosure discloses an array substrate, a display panel and a display device. The array substrate includes gate regions, gate lines, data lines, pixel electrodes and common electrode lines. The common electrode lines and the gate lines have the same extension direction, the pixel electrodes
(Continued)

are located in regions defined by adjacent gate lines and adjacent data lines, the gate lines traverse the gate regions in the extension direction that are located in the same row as the gate lines, and the pixel electrodes have a gap from the gate lines at ends thereof closer to the gate lines. As such, a portion of the gate region that extends to the pixel region has a reduced area and hence a reduced edge length. This way, during the cleaning of the active layer after formation, less active layer metal may remain at the edges of the gate region. Thereby, the array substrate fabrication process is improved, and a product yield rate of the array substrate is increased.

7 Claims, 4 Drawing Sheets

(52) U.S. Cl.
CPC .. *G02F 1/134309* (2013.01); *G02F 1/134336* (2013.01); *G02F 2201/121* (2013.01); *G02F 2201/123* (2013.01)

(58) Field of Classification Search
CPC .......... G02F 2201/121; G02F 2201/132; H01L 27/3248; H01L 27/3276–27/3279; H01L 27/3297; G09G 2300/0421–2300/0434
See application file for complete search history.

(56) References Cited

U.S. PATENT DOCUMENTS

| 2011/0037934 A1* | 2/2011 | Kang ............... G02F 1/136259 349/141 |
| 2011/0156995 A1 | 6/2011 | Choi et al. |
| 2013/0109120 A1* | 5/2013 | Choi ................. G02F 1/134363 438/34 |

FOREIGN PATENT DOCUMENTS

| CN | 102033347 A | 4/2011 |
| CN | 102141710 A | 8/2011 |
| CN | 102540604 A | 7/2012 |
| CN | 104749849 4 | 7/2015 |

OTHER PUBLICATIONS

Office Action in Chinese Application No. 201510201759.0 dated Mar. 10, 2017, with English translation. 9 pages.
Office Action received for Chinese Patent Application No. 201510201759.0, dated Nov. 8, 2017, 12 pages (6 pages of English Translation and 6 pages of Office Action).
International Preliminary Report on Patentability received for PCT Patent Application No. PCT/CN2015/087216, dated Nov. 2, 2017, 13 pages (8 pages of English Translation and 5 pages of Original Document).

* cited by examiner

ARRAY SUBSTRATE, DISPLAY PANEL AND DISPLAY DEVICE

CROSS-REFERENCE TO RELATED APPLICATIONS

The present application is the U.S. national phase entry of PCT/CN2015/087216, with an international filing date of Aug. 17, 2015, which claims the benefit of Chinese Patent Application No. 201510201759.0, filed on Apr. 24, 2015, the entire disclosures of which are incorporated herein by reference.

TECHNICAL FIELD

The present disclosure relates to the field of display technology, and particularly to an array substrate, a display panel and a display device.

BACKGROUND

With the development of the display technology, higher requirements are now imposed on the resolution of display products and thus higher requirements are imposed on the fabrication process of array substrates.

FIG. 1 schematically illustrates a plan view of a structure of a prior art array substrate. As shown in FIG. 1, a portion of each gate region G corresponding to a respective pixel unit N extends to the pixel region and has a large area, which is almost the area of the whole gate region G. Hence, the portion of the gate region G that extends to the pixel region has a large edge length. In the fabricate process of such an array substrate, as a cleaning solution flows to clean an active layer which has been formed, much of the metal from the active layer tends to remain at the edges of the gate region that extend to the pixel region. Since the active layer residual contains N+ conductive metal, a short circuit will be readily caused by the residual conductive metal between a pixel electrode and a data line in a region indicated with the dotted line box in FIG. 1 after fabrication of a source and a gate on the array substrate. Therefore, upon a subsequent monochromic image lighting test, an electrical current will flow from the pixel electrode to the adjacent data line due to the residual active layer metal, leading to a reduction of a voltage on the pixel electrode and hence its capability of driving liquid crystal to deflect. This results in dark points in the displayed image, which affect the quality of the displayed image.

Therefore, how to reduce the residual of active layer metal along the edges of the gate region in the array substrate fabrication process is a technical problem to be solved by those skilled in the art.

SUMMARY

An object of the present disclosure is to provide an array substrate, a display panel and a display device to solve the problem with the prior art that much of the metal from the active metal layer remains at the edges of the gate region in the array substrate fabrication process.

According to a first aspect of the present disclosure, an array substrate is provided which includes gate regions, gate lines, data lines, pixel electrodes, and common electrode lines. The common electrode lines and the gate lines have the same extension direction, the pixel electrodes are located in regions defined by adjacent gate lines and adjacent data lines, the gate lines traverse the gate regions in the extension direction that are located in the same row as the gate lines, and the pixel electrodes have a gap from the gate lines at ends thereof closer to the gate lines.

In a possible embodiment, in a layer where the gate region is formed, the gate region has a protrusion relative to the gate line in a direction perpendicular to the gate line.

In a possible embodiment, a region of the pixel electrode at the end closer to the gate line is retracted in a direction away from the gate line to enable the gate line to be arranged to traverse the gate region in the extension direction.

In a possible embodiment, a region of the pixel electrode at an end opposite to the retracted end has a protrusion corresponding to the gate line.

In a possible embodiment, a section of the common electrode line that corresponds to the gate region is bent toward a direction away from the gate region, and the remaining section thereof is bent toward a direction approaching the gate line.

In a possible embodiment, the common electrode lines and the gate lines are disposed in the same layer.

In a possible embodiment, the array substrate further comprises common electrodes connected with the common electrode lines.

In a possible embodiment, the array substrate further comprises active layers, source regions and drain regions. The active layers are located above the gate regions, the data lines are disposed in the same layer as the source regions and electrically connected with the source regions, and the pixel electrodes are located above the drain regions and electrically connected with the drain regions.

In a possible embodiment, the pixel electrodes are made of a transparent conductive metallic material.

According to a second aspect of the present disclosure, a display panel is provided including the above-mentioned array substrate.

According to a third aspect of the present disclosure, a display device is provided including the above-mentioned display panel.

Technical solutions according to embodiments of the present disclosure allow for a reduced area of the portion of the gate region that extends to the pixel region, and thereby a reduced length of the edges of the gate region that extend to the pixel region. As such, during the cleaning of the active layer after formation, less active layer metal may remain at the edges of the gate region and thereby a product yield rate of the array substrate is improved.

DETAILED DESCRIPTION

Embodiments of the present disclosure will be described in detail with reference to the drawings, in which a thickness of the film layers and sizes or shapes of the regions do not reflect true proportions of components of the array substrate, and are intended to illustrate the concepts of the present disclosure.

Figure 2:
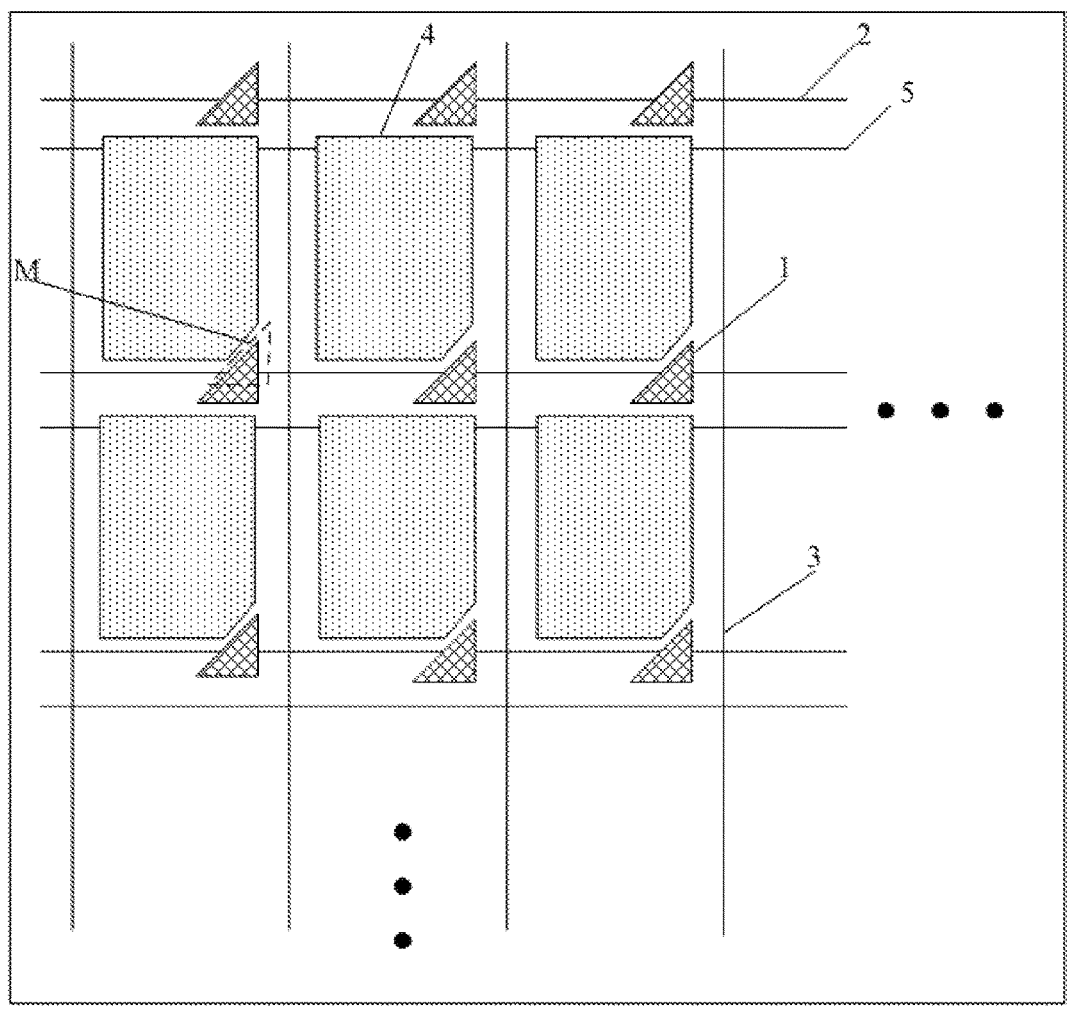
FIG. 2 schematically illustrates a plan view of a structure of an array substrate according to an embodiment of the present disclosure.

FIG. 2 schematically illustrates a plan view of a structure of an array substrate according to an embodiment of the present disclosure. As shown in FIG. 2, the array substrate may include gate regions 1, gate lines 2, data lines 3, pixel electrodes 4 and common electrode lines 5. The common electrode lines 5 and the gate lines 2 have the same extension direction, the pixel electrodes 4 are located in regions defined by adjacent gate lines 2 and adjacent data lines 3, the gate lines 2 traverse the gate regions 1 in the extension direction that are located in the same row as the gate lines 2, and the pixel electrodes 4 have a gap from the gate lines 2 at ends thereof closer to the gate lines 2.

Figure 1:
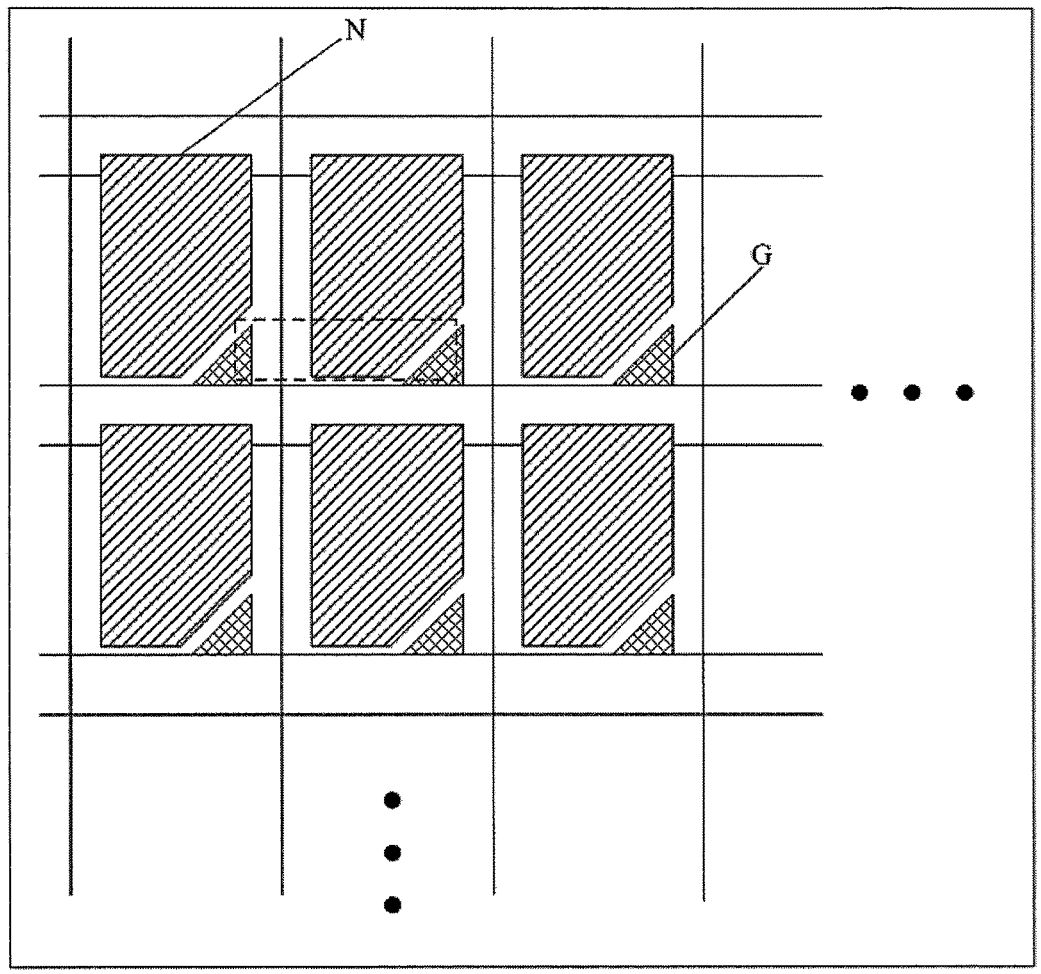
FIG. 1 schematically illustrates a plan view of a structure of an array substrate in the prior art.

Specifically, a region of the pixel electrode 4 at the end closer to the gate line 2 may be retracted in a direction away from the gate line 2, enabling the gate line 2 to be arranged such that it is translated in a direction toward the pixel electrode 4 and thereby traverses the gate region 1 in its extension direction. As shown in FIG. 2, a portion of the gate region 1 that extends to the pixel region has a reduced area (as compared with the dotted line box M in FIG. 2), and therefore the edges of the gate region 1 that extend to the pixel region may have a reduced length. In the prior art as shown in FIG. 1, the gate line is wired along an edge at an end of the gate region that is adjacent to the common electrode line, and therefore almost the entire gate region extends to the pixel region. In contrast, in the array substrate according to the embodiment of the present disclosure, the gate line 2 traverses the gate region 1 along its extension direction so that the area of the portion of the gate region 1 that extends to the pixel region is smaller and correspondingly the length of the edges of the gate region 1 that extend to the pixel region may be smaller.

In an embodiment, in a layer where the gate region is formed, the gate region has a protrusion relative to the gate line in a direction perpendicular to the gate line. For example, as shown in FIG. 2, the gate region 1 and the gate line 2 are integrally structured, wherein the gate line 2 runs in its extension direction through a middle position of the gate region 1, and the gate region 1 has a protrusion relative to the gate line 2 in a direction perpendicular to the gate line 2, which protrusion is the only portion of the gate region 1 that extends to the pixel region. As such, the area of the portion of the gate region 1 that extends to the pixel region is reduced and correspondingly the length of the edges of the gate region 1 that extend to the pixel region may be reduced. It should be noted that the shape of the gate region 1 in FIG. 2 is shown as a triangle only for purposes of illustration, and that the gate region 1 is not limited to the shown shape. It should also be noted that the common electrode line 5 is not connected with the pixel electrode 4 as shown in FIG. 2 which is a plan view, and that they are in fact located in different layers (discussed later).

Figure 3:
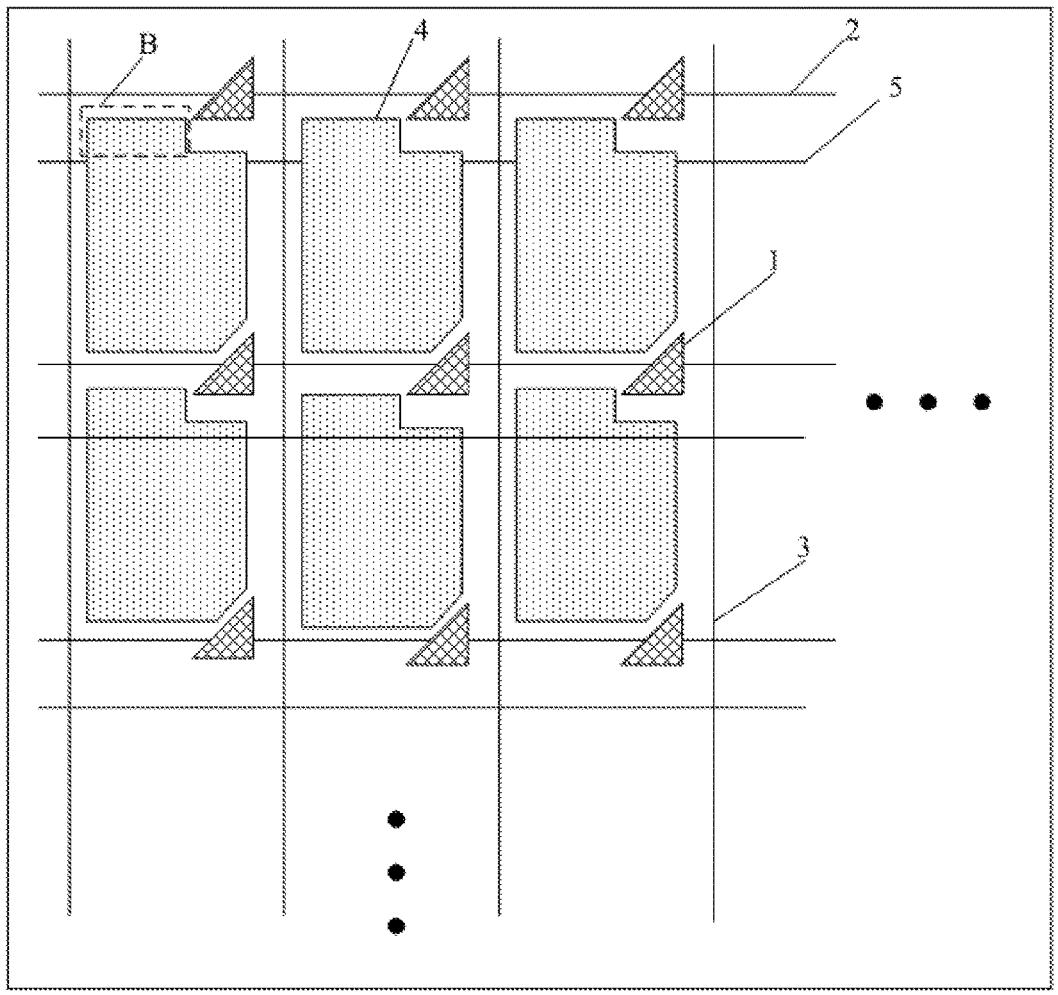
FIG. 3 schematically illustrates a plan view of a structure of another array substrate according to an embodiment of the present disclosure.

FIG. 3 schematically illustrates a plan view of a structure of another array substrate according to an embodiment of the present disclosure. As shown in FIG. 3, a region of the pixel electrode 4 at an end opposite to the retracted end may have a protrusion B (as indicated with the dotted line box in the figure) corresponding to the gate line 2. As such, with the shape of the pixel electrode 4 being changed, the protrusion B may compensate the reduced area at the other end of the pixel electrode 4 in a direction away from the gate line 2, such that the overall area of the pixel electrode 4 is not reduced and hence an aperture ratio is guaranteed.

Figure 4:
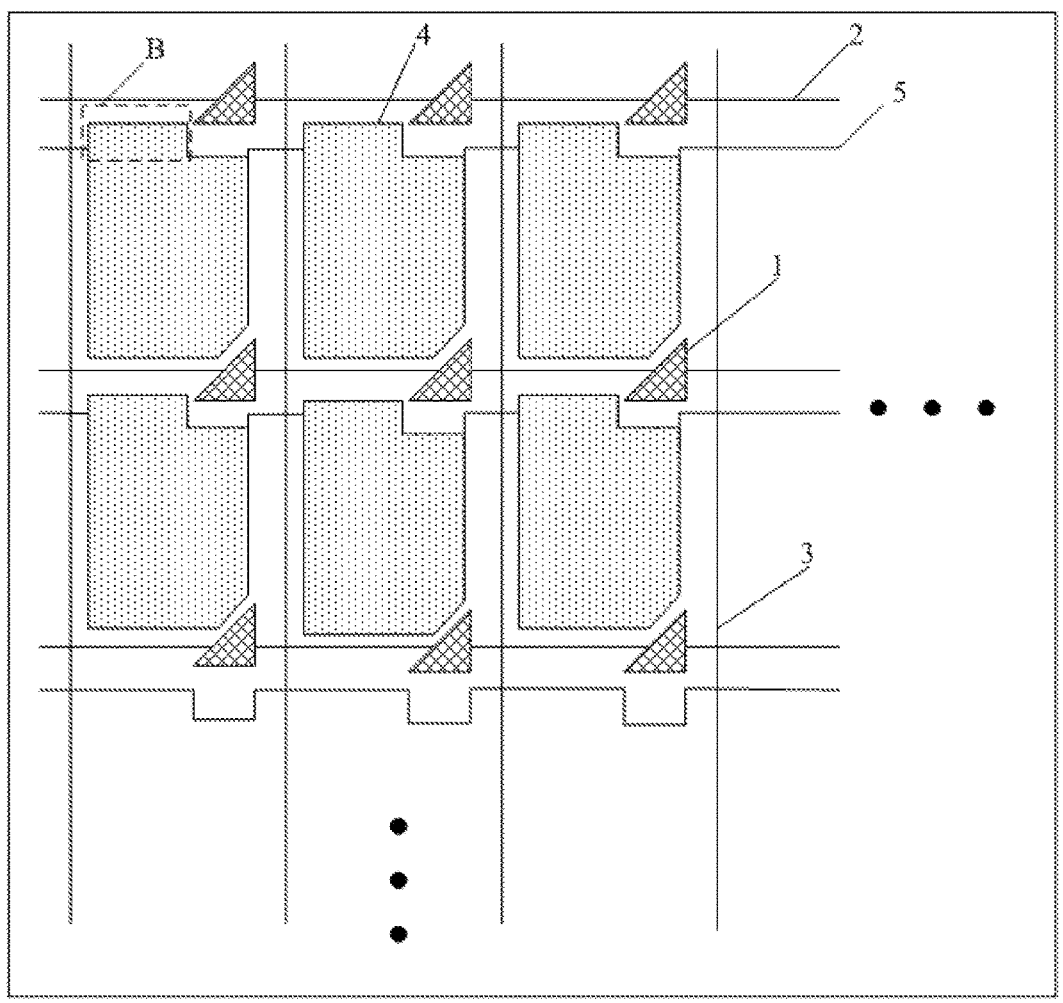
FIG. 4 schematically illustrates a plan view of a structure of yet another array substrate according to an embodiment of the present disclosure.

FIG. 4 schematically illustrates a plan view of a structure of yet another array substrate according to an embodiment of the present disclosure. As shown in FIG. 4, the common electrode line 5 may be arranged such that a section thereof that corresponds to the gate region 1 is bent toward a direction away from the gate region 1 and the remaining portion thereof is bent toward a direction approaching the gate line 2. Thus, the common electrode line 5 may be adaptively wired following the extension direction of the gate line 2 and the shape of the gate region 1, by rendering the common electrode line 5 a wire having bent structures in its extension direction. As such, the common electrode line 5 may be arranged closer to the pixel electrode 4 to reduce an area of a non-display region for wiring and improve the aperture ratio. In addition, as stated above, the region of the pixel electrode 4 at the end opposite to the retracted end may have the protrusion B that corresponds to the gate line 2, which may compensate the reduced area of the pixel electrode 4 due to the retraction, thereby keeping the area of the pixel electrode 4 unchanged and ensuring the aperture ratio of the array substrate.

In an embodiment, the common electrode line 5 and the gate line 2 are disposed in the same layer. As such, the gate line 2 and the common electrode line 5 may be formed by a one-time patterning process, thereby simplifying the fabrication process of the array substrate and reducing the production costs.

In an embodiment, the array substrate may further comprise common electrodes (not shown) connected with the common electrode lines 5. The common electrode lines 5 are used to input a common voltage signal and to transmit the common voltage signal to the common electrodes. When the display panel operates normally, the pixel electrodes 4 receive respective data voltage signals from the data lines 3, and the common electrodes receive the common voltage signal from the common electrode lines 5. Thereby, electrical fields may be formed between the pixel electrodes 4 and the common electrodes to drive liquid crystal molecules to deflect. A display function of the display panel is thus implemented.

In an embodiment, the array substrate may further comprise active layers, source regions and drain regions (all not shown). The active layers are located above the gate regions 1, the data lines 3 are disposed in the same layer as the source regions and electrically connected with the source regions, and the pixel electrodes 4 are located above the drain regions and electrically connected with the drain regions. Specifically, the gate regions 1 are located on a substrate base plate, and the active layers are located above the gate regions 1. When a scanning signal is input by the gate line 2, namely, a turn-on voltage is input to the gate region 1, a conductive channel may be formed in the active layer, through which the source and the drain are in conduction. Thus, the data voltage signal on the data line 3 electrically connected with the source region may be output to the drain region via the conductive channel and in turn, transferred to the pixel electrode 4 electrically connected with the drain region via the drain region to finally implement the display function of the display panel.

In an embodiment, the pixel electrode 4 may be made of a transparent conductive metallic material. The transparent conductive metal may include, but is not limited to, indium-tin-oxide (ITO).

According to another aspect of the present disclosure, a display panel is provided which comprises the above-mentioned array substrate.

According to a further aspect of the present disclosure, a display device is provided which comprises the above-mentioned display panel. The display device may be applied to any product or component having a display function, such as a mobile phone, a tablet, a TV set, a display, a notebook computer, a digital photo frame, and a navigator.

Although embodiments of the present disclosure have been described in detail with reference to the drawings, various modification and variations to embodiments of the present disclosure may be made by those skilled in the art without departing from the spirit and scope of the present disclosure. As such, if these modifications and variations fall within the scope of the appended claims and equivalents thereof, the present disclosure is intended to encompass these modifications and variations.

What is claimed is:

1. An array substrate, comprising:
   gate regions;
   gate lines each connected to respective ones of the gate regions;
   data lines intersecting the gate lines;
   pixel electrodes defined by adjacent ones of the gate lines and adjacent ones of the data lines, each of the pixel electrodes being arranged next to a respective one of the gate regions; and
   common electrode lines having a same length direction as a length direction of the gate lines, each of the common electrode lines being arranged next to a respective one of the gate lines,
   wherein each of the gate lines traverses, in the length direction of the gate line, the respective gate regions connected to the gate line at a middle position of each of the respective gate regions in a length direction of the data lines,
   wherein each of the pixel electrodes has a retraction region retracted away from a corresponding one of the gate lines at an end of the pixel electrode closer to the corresponding gate line,
   wherein each of the common electrode lines has a plurality of recess sections for respective ones of the gate regions, each of the recess sections being recessed away from a respective one of the retraction regions such that the recess section is arranged opposite to the respective retraction region with respect to the respective gate region, each of the recess sections having a first portion extending in a direction away from the respective gate region, a second portion extending in the length direction of the common electrode line, and a third portion extending in a direction approaching the respective gate region, the first portion being connected, only at an end away from the respective gate region, to the third portion via the second portion, and
   wherein each of the pixel electrodes, at an end thereof opposite to the end where the retraction region is located, consists of:
      a protrusion region protruding away the end where the retraction region is located in the length direction of the data lines, the protrusion region not overlapping in the length direction of the data lines with the gate region next to the pixel electrode, and
      a non-protrusion region overlapping in the length direction of the data lines with the gate region next to the pixel electrode,
      wherein the protrusion region is farther from the end where the retraction region is located than a point of the non-protrusion region farthest from the end where the retraction region is located.

2. The array substrate according to claim 1, wherein, in a layer where the gate regions are formed, each of the gate regions has a protrusion relative to the gate line to which the gate region is connected in a direction perpendicular to the length direction of the gate line.

3. The array substrate according to claim 1, further comprising common electrodes connected with the common electrode lines.

4. The array substrate according to claim 1, wherein the pixel electrodes are made of a transparent conductive metallic material.

5. A display panel, comprising the array substrate as claimed in claim 1.

6. A display device, comprising the display panel as claimed in claim 5.

7. An array substrate, comprising:
   gate regions;
   gate lines each connected to respective ones of the gate regions;
   data lines intersecting the gate lines;
   pixel electrodes defined by adjacent ones of the gate lines and adjacent ones of the data lines, each of the pixel electrodes being arranged next to a respective one of the gate regions; and
   common electrode lines having a same length direction as a length direction of the gate lines, each of the common electrode lines being arranged next to a respective one of the gate lines,
   wherein each of the gate lines traverses, in the length direction of the gate line, the respective gate regions connected to the gate line at a middle position of each of the respective gate regions in a length direction of the data lines,
   wherein each of the pixel electrodes has a retraction region retracted away from a corresponding one of the gate lines at an end of the pixel electrode closer to the corresponding gate line, and
   wherein each of the pixel electrodes, at an end thereof opposite to the end where the retraction region is located, consists of:
      a protrusion region protruding away from the end where the retraction region is located in the length direction of the data lines, the protrusion region not overlapping in the length direction of the data lines with the gate region next to the pixel electrode, and
      a non-protrusion region overlapping in the length direction of the data lines with the gate region next to the pixel electrode,
   wherein the protrusion region is farther from the end where the retraction region is located than a point of the non-protrusion region farthest from the end where the retraction region is located.

* * * * *